April 12, 1966　　　R. L. SHELLHAUSE　　　3,245,729
PROPORTIONING VALVE
Filed Feb. 27, 1964　　　　　　　　　　　　　2 Sheets-Sheet 1
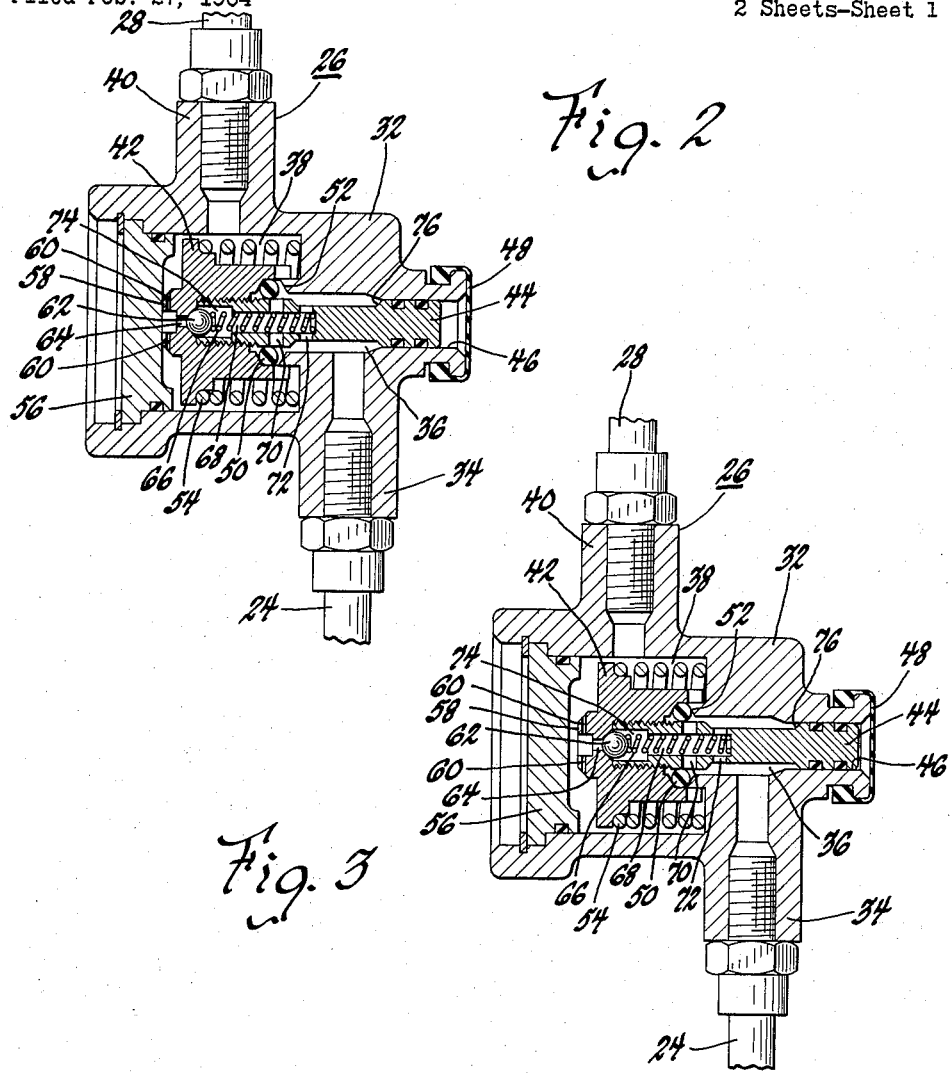
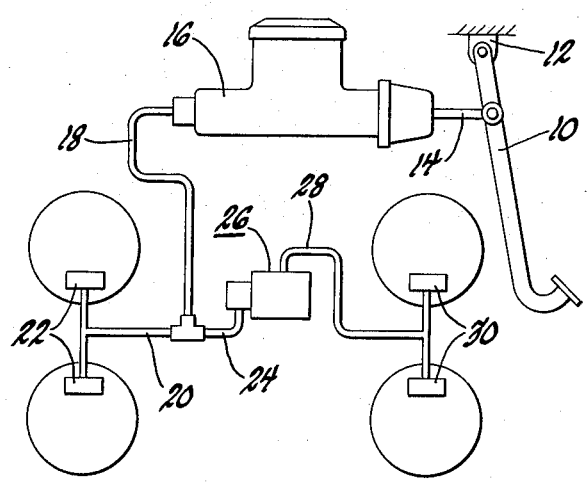
INVENTOR.
Ronald L. Shellhause
BY
D. D. McGrew
HIS ATTORNEY INVENTOR.
Ronald L. Shellhause
BY
D. D. McGraw
HIS ATTORNEY United States Patent Office 3,245,729
Patented Apr. 12, 1966

3,245,729
PROPORTIONING VALVE
Ronald L. Shellhause, Vandalia, Ohio, assignor to General Motors Corporation, Detroit, Mich., a corporation of Delaware
Filed Feb. 27, 1964, Ser. No. 347,912
11 Claims. (Cl. 303—24)

This invention relates to hydraulic valves and more particularly to a type of hydraulic valve which will proportion the pressure available to the rear wheel brakes of a vehicle relative to the front wheel brakes during periods of sudden deceleration.

As a vehicle, such as an automobile, is decelerated by applying its brakes, a weight shift occurs around the center of gravity in its driving direction. The vertical ground force on the rear wheels is being reduced while the ground force on the front wheels increases. This weight redistribution is governed by the physical laws of statics and dynamics and is directly dependent on the rate of deceleration, car weight and the friction factor between the road and tires as well as the road and weather conditions.

It is an object of the present invention to provide a valve which will proportion the hydraulic pressure available to the front and rear wheels during periods of rapid deceleration.

It is another object of the present invention to carry out the first-mentioned object while allowing the pressure distribution in a vehicle braking system to remain equal during periods of less rapid deceleration.

It is still another object of the present invention to provide a force proportioning valve for the braking system of a vehicle which is simple in operation and economical to manufacture.

Further objects and advantages of the present invention will be apparent from the following description, reference being had to the accompanying drawings wherein several preferred embodiments of the present invention are clearly shown.

In the drawings:

FIGURE 1 is a diagrammatic illustration of a typical vehicle braking system with the subject invention shown operatively positioned;

FIGURE 2 is a sectional view of the subject invention with the parts shown in a static configuration;

FIGURE 3 is a sectional view of the subject invention with the parts shown in a sealing configuration;

Figure 4:
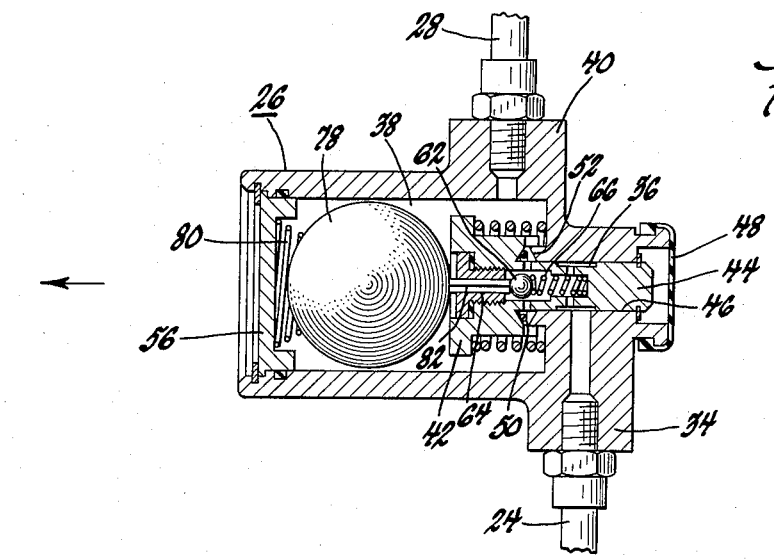
FIGURE 4 illustrates an embodiment of the subject invention which is responsive to vehicle deceleration.

Referring now to FIGURE 1, a brake pedal 10 is illustrated as pivotally suspended from a portion 12 of an automobile. A push rod 14 engages the brake pedal 10 and cooperates with a master cylinder 16 to displace hydraulic fluid therefrom into a brake line 18 when the brake pedal is depressed. Hydraulic pressure is thereafter distributed equally through a line 20 to the front wheel brakes 22 of an automobile and through a line 24 to a proportioning valve 26 which ultimately distributes hydraulic pressure through a line 28 to the rear wheel brakes 30 of the automobile.

Referring now to FIGURE 2, the proportioning valve is generally designated by the numeral 26. A control body 32 has an inlet portion 34 connected to the hydraulic line 24. The inlet 34 is in fluid communication with a chamber 36, hereinafter referred to as the smaller chamber. The smaller chamber 36 communicates with a larger chamber 38 which, in turn, is in fluid communication with an outlet 40 connected to the hydraulic line 28 to the rear wheel brakes of the vehicle.

A valve 42 is disposed within the valve body 32 and is arranged for translational movement therein. An extension 44 of the valve 42 is adapted to slide in the bore 46 of the valve body 32. The bore 46 is an outlet from the smaller chamber 36 to the atmosphere. A rubber boot 48 fits around the outside of the bore 46 and serves to prevent foreign material from entering the valve body. An O-ring 50 fits around a portion of the valve 42 and is adapted to seal against a portion of the valve body 32 at point 52. The O-ring can have a circular cross sectional configuration as illustrated but a flat or concave sealing periphery may be desirable in certain higher pressure installations. A spring 54 serves to bias the valve 42 away from the bore 46 and in the direction of a housing plug 56 forming an end wall of the larger chamber 38. A bumper portion 58 of the valve 42 abuts the housing plug 56 when the valve 42 is in a position of rest. A series of relief ports 60 provides a path for fluid to one side of a ball check valve 62. The ball check valve 62 is biased by a spring 66 into sealing engagement with an aperture 64 formed in valve 42.

The valve extension 44 has a hollowed-out portion 68 in which the spring 66 is disposed. A series of passages 70 and 72 formed in the outside wall of the hollowed portion 68 provide a path for fluid flow through the center of the valve extension 44. A compartment 74, formed in the center of the valve 42, is in fluid communication with the hollow portion 68 and provides an area of operation for the ball check valve 62.

In operation, the braking system, diagrammatically illustrated in FIGURE 1, is constantly full of hydraulic fluid with only a residual pressure. When the brake pedal 10 is depressed, the push rod 14 will travel into the hydraulic master cylinder 16 and act on a master cylinder piston to pressurize the fluid in any well-known manner. It is seen in FIGURE 1 that a build-up of pressure in the hydraulic master cylinder 16 will provide a pressure in the line 18, the line 18 being the outlet from the master cylinder 16. Therefore, an equal pressure will be present in the lines 20 to the front wheel brakes and in the line 24 to the proportioning valve.

Referring now to FIGURE 2, as the pressure enters the inlet 34 from the line 24, the smaller chamber 36 is pressurized along with the larger chamber 38 and the line 28 through the outlet 40. The pressure build-up will continue inside the small chamber 36 and larger chamber 38 until hydraulic pressure effectively exerted against the valve extension 44 at points 76 overcomes the biasing force of the spring 54. Thereafter, the valve extension 44 will be driven to the right, as viewed in FIGURE 2, thereby drawing the valve 42 toward the right against the pressure of the spring 54. As the pressure buildup exceeds the strength of the spring 54, the O-ring 50 will be drawn into sealing engagement with the valve body 32 at point 52, thereby sealing any further pressure build-up from the larger chamber 38.

The relief ports 60 provide a similar pressure build-up behind the ball check valve 62 and, in view of the build-up of pressure in the hollowed portion 68, the balance of pressure will cause the ball check valve 62 to remain stationary against the side of the aperture 64.

The proportioning valve is shown in FIGURE 3 in the position it will assume after the build-up of pressure from the master cylinder has reached the point where the valve 42 and the valve extension 44 have moved completely to the right with O-ring 50 in sealing engagement with the valve body on the seat 52. While the valve is in this position, it is apparent that no further pressure will be transferred to the outlet line 28. However, as pressure continues to build up in the smaller chamber 36, a force will be exerted on the sealed O-ring 50 until the pressure will distort the O-ring 50 and allow pressure to be transferred into the larger chamber 38 and on to the rear wheel brakes through the line 28. Again, as the pressure in the larger chamber 38 reaches the point where it is equal to the predetermined differential established by the spring 54, the valve 42 and the extension 44 will again move into sealing engagement with the seat 52. While pressure is building up in the master cylinder, this cycling is occurring continuously and the valve is modulating pressure and establishing a set differential between the inlet 34 and the outlet 40. It is thus apparent that, once spring 54 has been overcome to establish the valve modulating condition, there will always be a pressure differential between the front wheel brakes and the rear wheel brakes of the vehicle with this proportioning valve installed as described.

As pressure is released from the line 24 by depressurization of the master cylinder 16, there will be a greater pressure trapped in the larger chamber 38 than in the smaller chamber 36, as viewed in FIGURE 3, and, consequently, the ball check valve will be forced from its seat and pressure will bleed past the ball check valve into the smaller chamber 36, tending to equalize the pressure between the two chambers. This will continue until the braking system is at a static or residual pressure and the valve 42 will then move leftwardly, as viewed in FIGURE 3, to its position of rest against the housing plug 56.

Referring now to FIGURE 4, another embodiment of the present invention is illustrated wherein an inertia ball 78 is disposed in the larger chamber 38 between a biasing spring 80 and a ball check valve release pin 82. The remainder of the components of the modification of the proportioning valve, as illustrated in FIGURE 4, are the same as those illustrated in FIGURES 2 and 3.

In operation, the proportioning valve 26, viewed in FIGURE 4, is positioned in a vehicle so that the inertia ball 78 is positioned in the direction of vehicle forward movement when related to the position of the valve 42. The arrow indicates the vehicle forward movement direction. It is clear from an examination of FIGURE 4 that the inertia ball 78 bears against the release pin 82 holding the ball check valve 62 away from the aperture 64. While in this position, the pressure available at the outlet 40 is essentially the same as that at the inlet 34.

When the inertia ball 78 is caused to move toward the left, as viewed in FIGURE 4, by a rapid deceleration of the vehicle on which the valve is mounted, it will move against the tension of the spring 80 in the direction of the housing plug 56. As this movement occurs, the release pin 82 will be driven in the direction of the inertia ball 78 by the force of the spring 66 acting through the ball check valve 62. When the ball check valve 62 becomes seated, the cycle of operation of the proportioning valve becomes the same in this modification as previously described for the modification shown in FIGURES 2 and 3. However, in this modification, the proportioning valve is responsive to the deceleration of an automobile of a magnitude sufficient to depress the spring 80 and, therefore, as a rapid deceleration ceases, the inertia ball 78 will return to a position where the release pin 82 again depresses the ball check valve 62 and drives it out of engagement with the aperture 64. Thereafter, any pressure build-up from the master cylinder will be felt equally in the rear wheels of a vehicle through the outlet 40 as it becomes available at the inlet 34. It is apparent from an examination of the proportioning valve illustrated in FIGURE 4 that the modulating effect of the valve 42, as described in the previous embodiment, will be the same so long as the inertia ball 78 is held against the housing plug 56 during the deceleration of the automobile.

Figure 5:
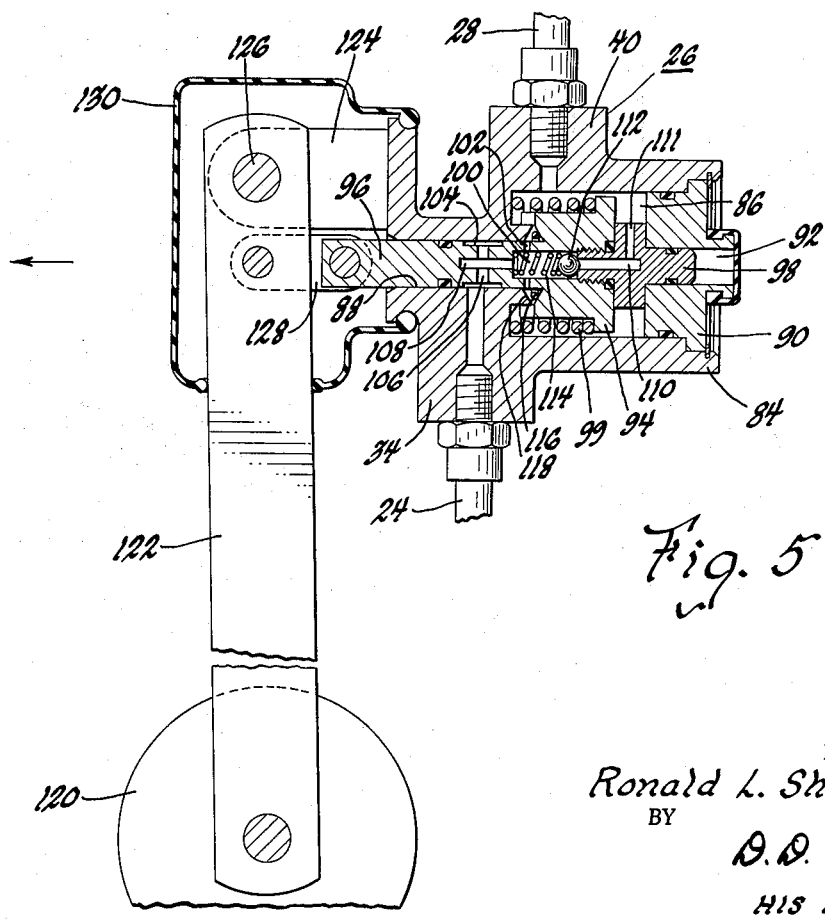
FIGURE 5 illustrates another embodiment of the subject invention which is responsive to vehicle deceleration.

Referring now to FIGURE 5, another embodiment of the present invention is shown. The external connections of this proportioning valve to the hydraulic braking system are similar to that as viewed in FIGURE 1. In this embodiment, an inlet 34 to the valve body 84 is illustrated. An outlet 40 to a line 28 disposed in fluid communication with the rear brakes of the automobile is also shown. The valve body 84 has a larger chamber 86 with a bore 88 going to the atmosphere. A housing plug 90 provides one wall for the chamber 86 and has disposed therein a bore 92 also going to the atmosphere.

The valve 94 has an extension 96 arranged to slide in the bore 88. Another extension 98 of the valve 94 is arranged to be slidably disposed in the bore 92 of the plug 90 and a spring 99 urges valve 94 to the right. A chamber 100 is formed in the center of the valve 94 and has ports 102 disposed in the walls thereof to provide egress for fluid. A peripheral groove 104 formed on the outside of the extension 96 forms a passage connecting with a cross port 106 in extension 96. A passage 108 is also formed in extension 96 so as to connect the port 106 with the chamber 100. A passage is formed by intersecting holes 110 and 111 in extension 98 which provide an access for hydraulic fluid from the larger chamber 86 to the chamber 100. The check valve 112 is biased into engagement with the end of hole 110 by a spring 114. An O-ring 116 is circumferentially disposed on a portion of the valve 94 and is adapted to seal against a seat 118 formed on the valve body 84. A weight 120 is suspended at the end of a lever arm 122 which is pivotally mounted to a bracket 124 at point 126. The weight 120 serves as inertial means to be hereinafter described. The bracket 124 is attached to a wall of the valve body 84 in any well-known manner. A link 128 pivotally connects one end of the valve extension 96 and the lever arm 122. A rubber boot 130 is attached to the valve body 84 in any well-known manner and serves to keep the pivoting portions of the lever arm and the link free of dirt and extraneous matter.

In operation, the proportioning valve illustrated in FIGURE 5 is connected to the hydraulic system of a vehicle in much the same manner as the previous embodiments. When the vehicle upon which the proportioning valve is mounted is decelerated, the weight 120 pivots in the direction of movement of the vehicle, which, for purposes of this explanation, is deemed to be leftward as viewed in FIGURE 5, as indicated by the arrow. The weight 120, by virtue of its own inertia operating through the link 128, will draw the valve extension 96 toward the left. Pressure will continue to flow in the normal manner between the lines 24 and 28 until the weight 120 has moved sufficiently to draw the O-ring 116 into engagement with the valve body 84 at the seat 118. When this occurs, the incoming pressure through the line 24 is prevented from going to the outlet and the line 28 to the rear wheel brakes and all of the additional pressure generated by the master cylinder is caused to be exerted through the line 20 to the front wheel brakes. As the inlet pressure acting on the annular valve area defined by the line of contact of O-ring 116 with seat 118 and the outer diameter of extension 96 continues to build up and the weight 120 is still swung toward the left, the pressure will force valve 94 slightly to the right and provide some flow to the outlet 28 past the O-ring 116. It is apparent that this flow through the line 28 will be of a reduced nature relative to the input through the line 24 and, therefore, the rear wheel brakes will continually have somewhat lesser pressure applied than applied to the front wheel brakes. The cycle of opening and closing of the pressure flow is due to a modulating action of the O-ring 116 and causes an action similar to that performed in the previous embodiments by the O-ring.

When the pressure from the master cylinder is released and the pressure into the peripheral groove 104 from the line 24 is reduced below that trapped in the large chamber 86 and in the rear wheel brake lines, the pressure from the large chamber 86 will act through the holes 110 and 111 to unseat the ball check valve 112, thereby tending to equalize the pressure between the chamber 100 and the enlarged chamber 86. This functioning of the ball check valve is again similar to the relieving of pressure as described in the previous embodiments.

The various embodiments of this proportioning valve, as previously described, have utility in an application where it is desired to proportion the pressure available to various segments of a hydraulic system from a common pressure source. An automobile braking system offers an area of particular utility for the subject device in that several embodiments of the device are responsive to deceleration through the inertial means described. It is obvious that the second and third embodiments described will be responsive to deceleration of an automobile or other vehicle of a similar type. If the deceleration is not sufficient to move the inertia means a predetermined distance, the valve will continue to function in a straight line manner and will have no proportioning characteristics.

The embodiment described in FIGURES 2 and 3 is very responsive to a surge in hydraulic pressure and will proportion the pressure availability to the rear wheels relative to the front wheels any time that a sudden pressure build-up occurs from the master cylinder. The embodiments viewed in FIGURES 4 and 5 are less responsive to surges of pressure, but the force of spring 80 exerted on the inertia ball in the embodiment of FIGURE 4 and the strength of the spring 99 biasing the valve toward the right, as viewed in FIGURE 5, can be varied to bring about any degree of response that is desired.

While the embodiments of the present invention as herein disclosed constitute preferred forms, it is understood that other forms might be adopted.

What is claimed is as follows:

1. A force proportioning device comprising; a housing having an inlet, a fluid pressure source in fluid communication with said inlet to provide an input pressure, a fluid chamber in pressure communication with said inlet from said pressure source and including an inlet and an outlet, force operable means in pressure communication with said fluid chamber, and valve means slidably disposed for translational movement in said fluid chamber for lowering the available pressure to said force operable means from said fluid pressure source a fixed amount below the input pressure to said fluid chamber, said valve means having differential areas acted on by an input pressure and by atmospheric pressure.

2. A force proportioning device comprising; a fluid pressure source, a housing having a fluid chamber formed therein and in pressure communication with said pressure source, said housing having a cylinder opening to atmospheric pressure and connecting with said fluid chamber, force operable means in pressure communication with said fluid chamber, and valve means in said chamber and including a piston reciprocably disposed in said cylinder, said piston having differential areas acted upon by a force from said pressure source and by atmospheric pressure, said valve means being adapted to move into sealing engagement with a wall of the fluid chamber in response to pressure surges from said fluid pressure source to modulate pressure being delivered to said force operable means, said valve means including proportioning means whereby the pressure available from the fluid pressure source to the pressure operable means is maintained a fixed amount lower than the pressure input to said fluid chamber.

3. A force proportioning valve for a vehicle hydraulic braking system including front and rear wheel brakes, said valve comprising; a fluid pressure source for the braking system, a valve body having a pressure chamber therein and disposed in the braking system between the front and rear wheel brakes with fluid pressure from said fluid pressure source being available equally to the front wheel brakes and an inlet to the pressure chamber of the valve body, outlet means from said pressure chamber to the rear wheel brakes, and valve means including a piston disposed for translational movement in said valve body between the inlet and the outlet of the pressure chamber therein, said valve means having differential areas and proportioning means responsive to an input pressure provided to the front wheel brakes of the vehicle and to atmospheric pressure to lower the pressure available to the rear wheel brakes an amount equal to a predetermined differential from that available to the front wheel brakes to the front wheel brake pressure.

4. A braking force proportioning valve for distributing the hydraulic pressure in a vehicle braking system in a manner preventing rear wheel lock-up during a sudden stop, said valve comprising: a fluid pressure source providing an equal fluid pressure availability to the force proportioning valve and the front wheel brakes of a vehicle; a valve body having a chamber in fluid communication with said fluid pressure source, said chamber having an inlet from said fluid pressure source, an outlet to the rear wheel brakes of a vehicle, and a port to the atmosphere; and valve means disposed for sliding translational movement in said valve body, said valve means including a piston movable in the port to the atmosphere in the valve body in response to a sudden pressure surge from said fluid pressure source thereby sealing the inlet of the valve body from the outlet of the valve body and sealing means carried by said piston and engageable with said valve body to shut off fluid communication between said inlet and said outlet, said sealing means being deformable when a predetermined pressure differential is exceeded to selectively re-establish fluid communication between the inlet and outlet to maintain the predetermined differential, said valve means having means adapted to store energy from the fluid pressure source in sealing the inlet from the outlet, the last mentioned means regulating a pressure drop across the force proportioning valve thereby proportionally lowering the fluid pressure availability to the outlet to the rear wheel brakes relative to the pressure availability to the front wheel brakes.

5. A valve according to claim 4 wherein the last mentioned means is a spring arranged to bias the valve means away from the port to the atmosphere.

6. A force proportioning valve for lowering the fluid pressure available to the rear wheel brakes of a vehicle during a sudden stop, said valve comprising: a chambered valve body having an inlet, an outlet, and an opening to the atmosphere; a fluid pressure source in fluid communication with the front wheel brakes of a vehicle and the inlet to the force proportioning valve; the outlet of the valve body being in fluid communication with the rear wheel brakes of a vehicle; valve means including a piston slidably disposed for translational movement in the opening in the valve body to the atmosphere, and inertia means disposed in said valve body, said valve means including a normally open check valve providing a pressure bypass for said valve means, said inertia means being responsive to the deceleration of the vehicle for closing the check valve thereby allowing a proportionally lower pressure to be available to the rear wheel brakes of the vehicle during a condition of a sudden stop.

7. A valve according to claim 6 wherein the inertia means is a weighted ball biased into engagement with the check valve for maintaining the check valve in an open position.

8. In a vehicle hydraulic braking system having front and rear wheel brakes operated by pressure from a hydraulic pressure source, a force proportioning valve comprising: a valve body having an inlet from the hydraulic pressure source and an outlet to the atmosphere and an outlet to the rear wheel brakes; valve means slidably disposed within said valve body and including an extension arranged to slide in the outlet to the atmosphere of the valve body; sealing means carried by said valve eans and adapted to form a pressure block between the
let from the hydraulic pressure source and the outlet
the rear brakes; and inertia means engaging said valve
eans and putting the valve means in a condition where
 can be moved in the direction of the outlet to the
mosphere in the valve body in response to sudden
celeration of the vehicle thereby causing a pressure
ock to the rear wheel brakes of the vehicle, said valve
eans having relief valve means arranged to break the
essure block to the rear wheels as the pressure from
e hydraulic pressure source drops below the trapped
essure in the outlet to the rear wheel brakes.

9. A force proportioning valve according to claim 8
herein the inertia means is a weight slidably responsive
 vehicle deceleration to free said valve means for
peration thereby maintaining a predetermined pressure
ifferential between the front and rear wheel brakes of
vehicle.

10. In a vehicle braking system having an hydraulic
ressure source connected to front and rear wheel brakes
r actuation thereof, an hydraulic pressure proportion-
g device comprising; a valve body including an inlet
nd an outlet therefor, said valve body having an enlarged
hamber disposed in direct fluid communication with the
utlet from said valve body and the smaller chamber
isposed in fluid communication with the inlet to said
alve body, first valve means disposed in slidable rela-
onship with the smaller chamber and being adapted to
electively seal the smaller chamber from the enlarged
hamber, the inlet to the smaller chamber being in fluid
ommunication with the hydraulic pressure source and
he outlet being in fluid communication with the rear
vheel brakes, second valve means slidable in said first
alve means to relieve trapped pressure on brake release,
and inertia force developing means engaging said second
valve means, said inertia force developing means being
responsive to sudden deceleration of the vehicle to move
said second valve means into a sealing position between
the smaller and enlarged chambers of the valve body
thereby directing the full pressure of the hydraulic pres-
sure source to the rear wheel brakes initially, said first
valve means having biasing means arranged to subse-
quently modulate the amount of pressure made available
to the rear wheel brakes in a lesser proportion than that
made available to the front wheel brakes, said second
valve means serving as relief means for relieving any pres-
sure that becomes trapped between the valve means and
the rear wheel brakes, said second valve means being
operative in response to a drop in pressure from the
hydraulic pressure source below that of the trapped
pressure.

11. An hydraulic pressure proportioning device accord-
ing to claim 10 wherein the valve biasing means is a
spring circumferentially mounted between a portion of
the valve and a wall of the enlarged chamber of the valve
body.

References Cited by the Examiner
UNITED STATES PATENTS

| 2,835,271 | 5/1958 | Oberthur | 60—54.5 |
| 3,088,285 | 5/1963 | Giacosa et al. | 303—6 |
| 3,144,920 | 8/1964 | Price | 303—49 |
| 3,147,046 | 9/1964 | Stelzer | 303—6 |

BENJAMIN HERSH, *Primary Examiner.*

EUGENE G. BOTZ, A. HARRY LEVY, *Examiners.*

M. S. SALES, *Assistant Examiner.*